United States Patent [19]

Kao et al.

[11] Patent Number: 5,151,151
[45] Date of Patent: Sep. 29, 1992

[54] PLEATING MACHINE FOR DUAL FLUTED SHADE

[76] Inventors: Jamee Kao, 2400 S. Whitehall Dr.-#206Q, Mundelein, Ill. 60060; Joseph C. S. Hsu, 35 Lane 461 Chung-Shan N. Road Sec. 5, Taipei, Taiwan, 111

[21] Appl. No.: 286,368

[22] Filed: Dec. 19, 1988

Related U.S. Application Data

[60] Continuation-in-part of Ser. No. 24,695, Mar. 11, 1987, Pat. No. 4,795,515, Ser. No. 286,368, Dec. 19, 1988, Division of Ser. No. 145,369, Jan. 19, 1988, Pat. No. 4,871,006.

[51] Int. Cl.⁵ .................. B32B 3/12; B65H 37/04
[52] U.S. Cl. ..................... 156/471; 156/197; 156/205; 156/292; 156/470; 156/474; 160/84.1; 425/336; 425/370
[58] Field of Search ............... 156/474, 197, 205, 210, 156/459, 470, 471, 472, 473, 292, 65; 264/286, 287; 425/336, 343, 369, 370, 396; 160/84.1; 493/423, 441

[56] References Cited

U.S. PATENT DOCUMENTS

| | | | |
|---|---|---|---|
| 230,091 | 7/1980 | Walker | 425/371 X |
| 1,284,771 | 11/1918 | Quinn | 425/369 |
| 2,949,639 | 8/1960 | Woodward | 264/286 X |
| 3,157,551 | 11/1964 | Granozio | 425/370 X |
| 3,510,383 | 5/1970 | Yovanovich | 156/473 X |
| 3,660,189 | 5/1972 | Troy | 156/292 X |
| 3,738,905 | 6/1973 | Thomas | 156/210 X |
| 4,288,485 | 9/1981 | Suominen | 428/116 |
| 4,673,600 | 6/1987 | Anderson | 160/84.1 X |

Primary Examiner—Michael W. Ball
Assistant Examiner—Michele K. Yoder

[57] ABSTRACT

A pleating machine for dual fluted shades consisting of a pair of cooperating sets of pleating conveyors closely adjacent and flanking a sealing device that joins the two resulting pleated webs together by transversely fed attaching sheets.

4 Claims, 2 Drawing Sheets

PLEATING MACHINE FOR DUAL FLUTED SHADE

RELATED APPLICATIONS

This application is a continuation-in-part of U.S. Ser. No. 024,695 filed Mar. 11, 1987, now U.S. Pat. No. 4,795,515 issued on Jan. 3, 1989, and a division of U.S. Ser. No. 145,369 filed Jan. 19, 1988, now U.S. Pat. No. 4,871,006 issued on Oct. 3, 1989.

BACKGROUND OF THE INVENTION

Expandable honeycomb structures have been used for many years as window coverings and are in some cases constructed of two separate pleated materials which are secured together either with or without additional materials so they define a plurality of longitudinally extending tubes or cells, one on top of the other. In the retracted state of the honeycomb structure, the adjacent cells are collapsed on each other. An example of such an expandable honeycomb structure is shown in the Anderson U.S. Pat. No. 4,685,986. Anderson forms the honeycomb structure by feeding previously pleated first and second sheets in opposite directions toward a pressure member. As the pleats approach the pressure member, one side of each pleat is covered with an adhesive and thereafter adjacent pleats in the first and second previously pleated sheets are pressed by the pressure member against two reciprocating pleating knives and the resulting honeycomb structure is fed in a direction perpendicular to the direction of travel of the first and second pleated sheets.

While the Anderson method produces a satisfactory honeycomb structure it nevertheless is quite costly because it requires the use of previously pleated material.

The Anderson, U.S. Pat. No. 4,673,600 shows in its FIGS. 3 and 6 embodiment, an accordion pleated honeycomb window covering that is formed by two accordion pleated webs connected by a plurality of strips. The accordion pleating construction, however, results in a plurality of flat planar exterior surfaces, each of which deflects light only in a single direction and hence does not optimize the insulating characteristics of the wall covering.

It is a primary object of the present invention to ameliorate the problems noted above in pleated window shades.

SUMMARY OF THE PRESENT INVENTION

In accordance with the present invention, a superior insulating dual fluted shade is provided that consists of two parallel one-piece webs of material each with deep adjacent arcuate flutes connected to one another directly by parallel strips without any intermediate layers of material.

The large radius deep arcuate flutes act to direct light in an infinite number of directions over an arc of substantially 180 degrees around each flute. This provides a far greater insulating characteristic for the resulting composite shade over heretofore known accordion pleated flutes that have flat planar walls that direct and deflect light in only a single direction.

Other objects and advantages of the present invention will appear more clearly in the following detailed description.

DETAILED DESCRIPTION OF THE PREFERRED EMBODIMENT

Figure 1:
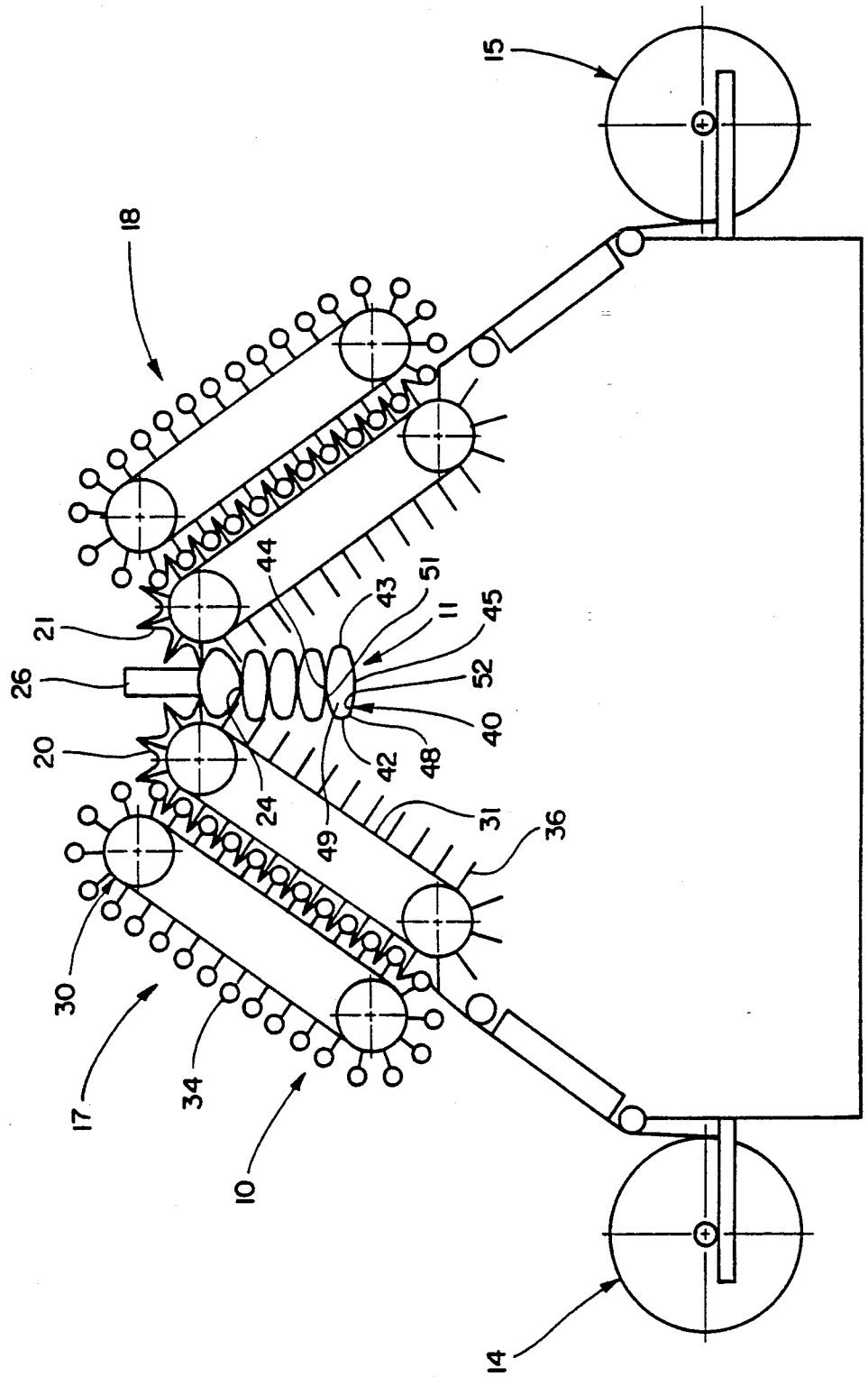
FIG. 1 is a diagramatic side view of a pleating and joining machine according to the present invention.
Figure 2:
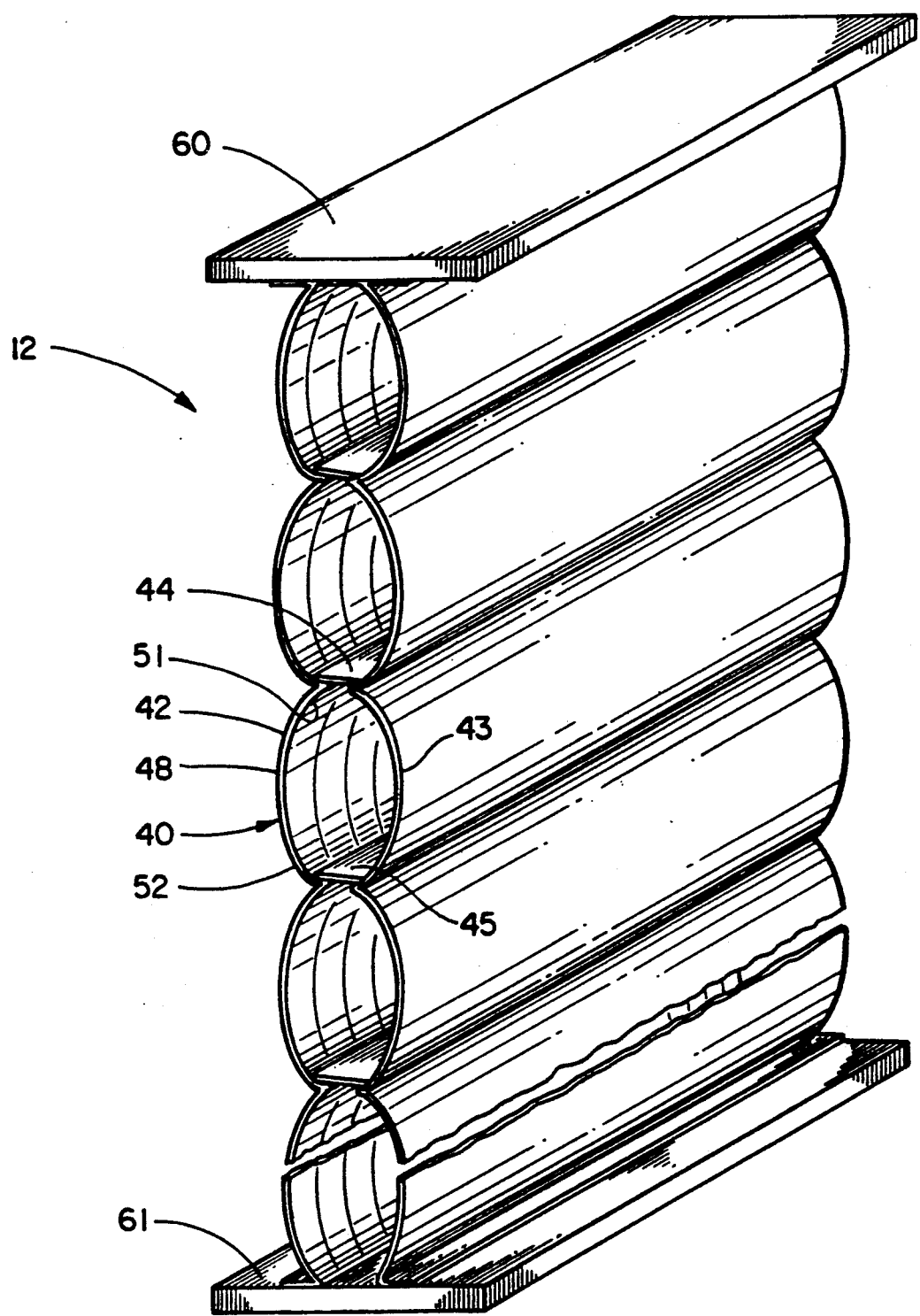
FIG. 2 is a perspective view of a dual fluted shade in the expanded condition produced by the machine illustrated in FIG. 1.

Referring to the drawings and particularly FIG. 1, a pleating and joining machine 10 is illustrated according to the present invention that produces a deep arcuate fluted shade composite illustrated at 11 in FIG. 1 in partly completed form and as a completed shade 12 as illustrated in FIG. 2.

The machine 10 includes a pair of web flexible fabric material rollers 14 and 15 that respectively feed material at an angle of approximately 60 degrees to each other to a pair of pleating and forming conveyors 17 and 18 that produce pleated webs 20 and 21 that are joined together by parallel joining strips 24 by a sealing device 26 positioned between the conveyors 17 and 18.

The conveyors 17 and 18 each consist of a pair of cooperating endless chain conveyors 30 and 31 relating 60 degrees with respect to one another with the upper conveyors 31 carrying a plurality of annular tube-like forming bars 34 that cooperate with a plurality of staggered pointed forming racks 36 carried by lower conveyors 31.

The cooperation of the forming bars 34 and the forming racks 36 form the deep flutes in each of the material webs 20 and 21.

The resulting cellular structure illustrated at 11 in FIG. 1 includes a plurality of cells 41 defined by first and second flutes 42 and 43 and top and bottom strips 44 and 45. Each of the flutes 42 and 43 consists of a large radius arcuate portion 48 having an axis 49 and substantially parallel flat leg portions 51 and 52 to which strips 44 and 45 are directly connected. Note that in the composite 11 illustrated in FIG. 1 that strip 44 is connected to the legs of the flutes in the cell immediately above cell 40.

An important aspect of the present invention is that the flutes are deeply formed to provide superior insulating characteristics and toward that end in its as formed condition illustrated in FIG. 1, the axes 49 of the arcuate portions 48 are spaced substantially from one another, although in the completed shade illustrated in FIG. 2, the flutes are not quite as deep when in a fully expanded condition or because of the additional weight of shade end members 60 and 61.

Note, however, that even in the weighted configuration illustrated in FIG. 2, that flutes 42 and 43 each have an arcuate extent of approximately 180 degrees when the shade is in a fully expanded condition.

We claim:

1. A single machine for making a series of expandable tubular polygons, comprising: means for feeding a first flexible sheet to a first pleating area, means for feeding a second flexible sheet to a second pleating area directly adjacent the first pleating area, first and second pleaters for simultaneously pleating the first and second sheets in the first and second areas so successive pleats in the first sheet are adjacent and aligned with pleats in the second sheet, each of the pleaters having a pleated sheet discharge end directly adjacent a seal area with the discharge ends facing generally toward one another and on opposite sides of the seal area, means for feeding an attachment strip transverse to the first and second sheets, and seal means in the seal area positioned between the first and second pleating areas for attaching the adjacent pleats in the first and second sheets together with the attachment strip to form the series of tubular polygons, said seal means being closely adjacent both of the first and second pleating areas so that the need for pleat supporting and feeding structure between the pleating areas and the seal means is minimized, each of the pleaters having a plurality of conveying and pleat forming elements thereon constructed to hold the sheets in the seal area as the seal means attaches the pleats together.

2. An apparatus for making a series of expandable tubular polygons as defined in claim 1, wherein the means for feeding the first and second sheets includes means for feeding the first and second sheets each at an angle of approximately 60 degrees with respect to one another.

3. An apparatus for making a series of expandable tubular polygons as defined in claim 1, wherein the means for simultaneously pleating the first and second sheets in the pleating areas includes two pairs of pleating and forming conveyors each including an endless conveyor with forming bars and a cooperating endless conveyor with forming racks.

4. A single machine for making a series of expandable tubular polygons, comprising: means for feeding a first sheet of material toward a first pleating area to form a plurality of pleats in the first sheet, means for feeding a second sheet of material toward a second pleating area to form a plurality of pleats in the second sheet immediately adjacent pleats in the first sheet, first and second pleaters in the first and second pleating areas, each of the pleaters having a pleated sheet discharge end directly adjacent a seal area with the discharge ends facing generally toward one another and on opposite sides of the seal area, seal means in the seal area positioned between the first and second pleating areas for immediately after forming each adjacent pleat attaching the adjacent pleats in the first and second sheets together to form the series of expandable tubular polygons including means for feeding a third sheet transverse to the first and second sheets and attaching the third sheet to the first and second sheet pleats, said means for feeding the first and second sheets including means for feeding the first and second sheets including means for feeding the first and second sheets each at an angle of approximately 60 degrees with respect to one another, said seal means being closely adjacent and between both of the first and second pleating area so that the need for pleat supporting and feeding structure between the pleating areas and the seal means is minimized, each of the pleaters having a plurality of conveying and pleat forming elements thereon conducted to hold the sheets in the seal area as the seal means attaches the pleats together.

* * * * *